UNITED STATES PATENT OFFICE.

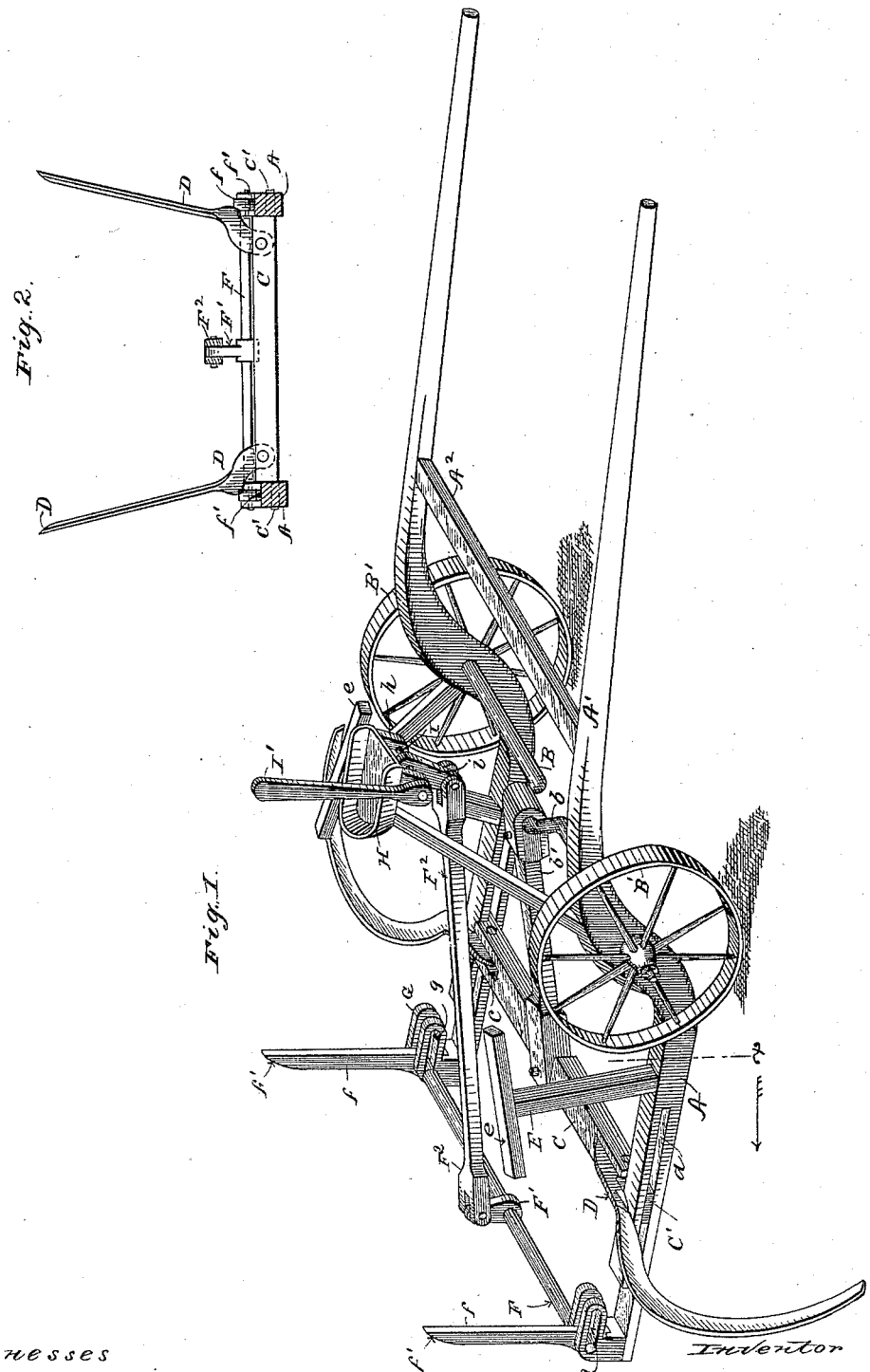

JACOB WEBER, OF CLEVELAND, OHIO.

CORN-CUTTER.

SPECIFICATION forming part of Letters Patent No. 426,344, dated April 22, 1890.

Application filed September 30, 1889. Serial No. 325,544. (No model.)

*To all whom it may concern:*

Be it known that I, JACOB WEBER, of Cleveland, in the county of Cuyahoga and State of Ohio, have invented certain new and useful Improvements in Corn-Cutters; and I do hereby declare the following to be a full, clear, and exact description of the invention, such as will enable others skilled in the art to which it pertains to make and use the same.

My invention relates to improvements in corn-cutters; and it consists in certain features of construction and in combinations of parts hereinafter described, and pointed out in the claims.

In the accompanying drawings, Figure 1 is a view in perspective. Fig. 2 is an elevation in transverse section on line $x\ x$, Fig. 1.

A represents side bars terminating forwardly in thills A', the latter being connected by cross-bar $A^2$, these side bars being mounted on axle B. The axle at the longitudinal center thereof is provided with crank $b$, and at the ends of the axle are traction-wheels B' B', the one of which is loose on and the other rigidly attached to the axle.

C is a cross-bar having tenons C' at the ends thereof that operate in slots $a$ of the side bars, this cross-bar being connected at the longitudinal center thereof by means of pitman $b'$ with crank $b$, aforesaid, for reciprocating the cross-head. The cross-head, near the ends thereof, is provided with vertical mortises at $c$, in which mortises are pivotally secured the shanks of cutters D, by which arrangement the cutters reciprocate forward and back with the cross-head; but the cutters may also be tilted to approximately an upright position, as shown in Fig. 2. The cutter-blades are of the curved variety shown, the outer or free ends thereof extending some distance forward of the line of the cross-head, by which arrangement the tendency of the cutters is to gather the cornstalks toward the machine.

Standards E are attached to the side bars, each standard having a horizontal bar $e$ attached at the top, the two bars $e$ standing obliquely with the machine, diverging from each other rearward, in which position bars $e$ have a tendency to push the cornstalks away from the machine—that is to say, these bars and the cutters act in opposite directions in gathering the cornstalks—the result of which is the stalks are bunched so that, as they are severed, the stalks fall in bundles approximately parallel with the movement of the machine. In traveling with the machine—for instance, to and from the corn-field—the cutters may be tilted upward, so as not to project beyond the line of the wheel, in which position the cutters are out of the way. For tilting the cutters I provide the following mechanism:

F is a rock-shaft operating and supported in horizontal slots $g$ of housings G, the latter being attached, as shown, to the side bars A. Shaft F has fingers $f$ attached near the ends thereof, these fingers near the ends having inclines $f'$. Shaft F at the center thereof has attached a rock-arm F', the latter connecting with pitman $F^2$.

H is the driver's seat, to which are attached hangers $h$, in which hangers is journaled a short shaft I. The shaft between the bearings has a depending rock-arm $i$, connecting with the pitman $F^2$, aforesaid. The one end of shaft I is provided with an upright hand-lever I'. In moving lever I' forward of course arm $i$ is moved rearward, and by means of the connecting-pitman $F^2$ shaft F is first moved to the rear end of slot $g$, after which the shaft is rotated, so as to elevate fingers $f$ to the position shown in Fig. 1. When cross-head C is at the extreme of its forward movement, by moving lever I' rearward shaft F is first turned forward so as to depress fingers $f$, the forward end of these fingers falling just back of the shank of the cutters, whereupon, with the rear movement of the cross-head, the shanks of the cutters mount inclines $f'$, whereby the cutters are tilted upward to the position shown in Fig. 2. By drawing lever I still farther rearward shaft F is moved bodily forward in the slots $g$, thus advancing fingers $f$, so that the inclines of these fingers are forward of the cutter-shanks at the terminus of the forward throw of the cutters, in consequence of which the cutters are maintained in an upright position, and the shanks thereof slide backward and forward on the fingers. By moving lever I' forward just as the cutters are at their extreme forward movement shaft F and fingers $f$ are first moved rearward, so that the fingers are drawn from under the cutters, and the still farther forward movement of lever I' rotates shaft F and elevates the fingers out of the way of the cutters.

What I claim is—

1. In a corn-cutter, the combination, with a frame, a reciprocating cross-head mounted thereon, and curved blades pivoted to the ends of said cross-head and adapted when not in use to be turned inwardly, of oblique stationary bars located in planes between the cutters and adapted to move the cornstalks laterally in the opposite direction from the action of the blades, substantially as set forth.

2. In a corn-cutter, the combination, with reciprocating cross-head, cutters pivoted to the cross-head so that the latter may be tilted upward, of rock-shaft having attached fingers adapted in the depressed position to engage and tilt upward the cutters, such rock-shaft being operatively connected with a hand-lever, whereby the fingers may be raised or lowered, substantially as set forth.

3. In corn-cutter, the combination, with reciprocating tilting cutters, rock-shaft having fingers adapted in their depressed position to engage and elevate the cutters, of slotted housings supporting such rock-shaft, whereby the shaft may be moved bodily in the slots, substantially as set forth.

In testimony whereof I sign this specification, in the presence of two witnesses, this 25th day of July, 1889.

JACOB WEBER.

Witnesses:
CHAS. H. DORER,
ALBERT E. LYNCH.